(12) United States Patent
Pinner et al.

(10) Patent No.: US 11,146,543 B2
(45) Date of Patent: Oct. 12, 2021

(54) CONTACT CONSOLIDATION ACROSS MULTIPLE SERVICES

(71) Applicant: VMware, Inc., Palo Alto, CA (US)

(72) Inventors: William Christian Pinner, Roswell, GA (US); David Shaw, Buford, GA (US); Evan Hurst, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 214 days.

(21) Appl. No.: 16/033,445

(22) Filed: Jul. 12, 2018

(65) Prior Publication Data

US 2020/0021574 A1    Jan. 16, 2020

(51) Int. Cl.
  *H04L 29/06* (2006.01)
  *G06F 16/951* (2019.01)

(52) U.S. Cl.
  CPC ...... *H04L 63/0815* (2013.01); *H04L 63/0853* (2013.01); *H04L 63/102* (2013.01); *G06F 16/951* (2019.01)

(58) Field of Classification Search
  CPC . H04L 63/0815; H04L 63/0853; H04L 29/06; H04L 63/102
  USPC .......................................................... 726/4
  See application file for complete search history.

(56) References Cited

U.S. PATENT DOCUMENTS

| | | | | |
|---|---|---|---|---|
| 8,225,385 B2 * | 7/2012 | Chow | ................ | H04W 12/084 726/8 |
| 8,255,991 B1 * | 8/2012 | Hackborn | ............... | H04L 67/06 726/21 |
| 9,178,868 B1 * | 11/2015 | Leung | .................... | H04L 67/02 |
| 10,469,484 B1 * | 11/2019 | Chen | ..................... | H04L 63/062 |
| 2006/0059071 A1 * | 3/2006 | Maitret | ................ | H04L 63/102 705/35 |
| 2008/0114868 A1 * | 5/2008 | Thayer | ................. | H04L 67/125 709/223 |
| 2008/0205655 A1 * | 8/2008 | Wilkins | ................ | G06Q 10/10 380/279 |
| 2010/0332834 A1 * | 12/2010 | Fu | ........................ | H04L 9/0822 713/170 |

(Continued)

*Primary Examiner* — Farid Homayounmehr
*Assistant Examiner* — Thanh T Le
(74) *Attorney, Agent, or Firm* — Thomas Horstemeyer, LLP

(57) ABSTRACT

Disclosed are various approaches for retrieving contacts from a plurality of federated services. A query is received from a client application executing on a client device, the query comprising a single sign-on token that identifies a user and a character string. A number of federated services that the user has permission to access are then identified. A plurality of authentication tokens are then retrieved from an authentication service, each of the plurality of authentication tokens identifying the user to a respective one of the plurality of federated services. Next, the authentication token and the character string are provided to a respective connector for each of the plurality of federated services that the user has permission to access. A plurality of responses are received, each of the plurality of responses being received from the respective connector corresponding to each of the plurality of federated services that the user has permission to access. Then the plurality of responses are provided to the client application executing on the client device.

20 Claims, 6 Drawing Sheets

(56) References Cited

U.S. PATENT DOCUMENTS

| | | | | |
|---|---|---|---|---|
| 2011/0078190 A1* | 3/2011 | Samuel | G06Q 50/01 | 707/780 |
| 2011/0113073 A1* | 5/2011 | Chang | G06F 16/20 | 707/803 |
| 2011/0143713 A1* | 6/2011 | Luft | H04L 63/04 | 455/411 |
| 2012/0089644 A1* | 4/2012 | Doggett | G06Q 10/109 | 707/780 |
| 2012/0096523 A1* | 4/2012 | Ollila | G06Q 10/10 | 726/5 |
| 2012/0124647 A1* | 5/2012 | Simula | H04L 67/22 | 726/4 |
| 2014/0082088 A1* | 3/2014 | Ye | G06Q 10/10 | 709/204 |
| 2014/0189840 A1* | 7/2014 | Metke | H04L 63/0884 | 726/9 |
| 2014/0304260 A1* | 10/2014 | Ulm | G06Q 10/107 | 707/728 |
| 2014/0310792 A1* | 10/2014 | Hyland | H04L 63/0815 | 726/8 |
| 2014/0337954 A1* | 11/2014 | Ahmed | H04L 63/0815 | 726/8 |
| 2016/0014119 A1* | 1/2016 | Inoue | H04L 63/0807 | 726/9 |
| 2016/0021097 A1* | 1/2016 | Shrotri | H04L 63/0815 | 726/8 |
| 2016/0028737 A1* | 1/2016 | Srinivasan | H04L 63/102 | 726/1 |
| 2016/0080383 A1* | 3/2016 | Hockings | G06F 21/6236 | 726/9 |
| 2016/0099924 A1* | 4/2016 | Mehta | H04L 61/1552 | 726/7 |
| 2017/0034172 A1* | 2/2017 | Biggs | H04L 63/08 | |
| 2018/0316657 A1* | 11/2018 | Hardt | H04L 67/06 | |
| 2019/0342280 A1* | 11/2019 | Shaw | H04L 9/3213 | |
| 2019/0342281 A1* | 11/2019 | Shaw | H04L 9/3228 | |
| 2020/0036707 A1* | 1/2020 | Callahan | H04L 9/3231 | |

\* cited by examiner

CONTACT CONSOLIDATION ACROSS MULTIPLE SERVICES

BACKGROUND

Users of computing devices (e.g., personal computers, mobile devices, etc) often have registered themselves with multiple services. For example, a user of a mobile computing device (e.g., a smartphone) may have a user account registered with his or her corporation's directory service, as well as third-party services such as FACEBOOK®, LINKEDIN®, SALESFORCE®, or similar services. As a result, a user may have information for some contacts stored locally in the address book provided by his or her phone, while additional contacts may be stored in his or her corporation's directory service as part of a corporate address book or stored by FACEBOOK, LINKEDIN, SALESFORCE, or similar services. Likewise, contact information for a single individual may be spread across multiple services. For example, a user may have a work phone number and a work email address for a contact stored by his or her corporation's directory service and a personal email address and a cellphone number for the same contact stored on FACEBOOK.

As a result, users often have to either synchronize their contacts between services or individually search each service for the contact information that is desired. For example, many address books or services allow a user to save multiple email addresses, multiple phone numbers, and multiple mailing addresses for a single contact. However, the user often has to manually enter missing information, such as manually inputting copying and pasting personal email addresses stored on FACEBOOK to corresponding contacts stored in a corporate directory or a locally stored address book. Moreover, if information changes, such as when a user changes his or her phone number or email address, the change has to be manually synchronized. When a user has a large number of contacts, manual synchronization may quickly become impractical.

In some instances, a user can use a synchronization tool to perform the manual process. But these synchronization tools often fail to automatically synchronize changes to contact information. In addition, these synchronization tools are often platform or application specific. For example, a synchronization tool may only work on a specific operating system or with specific email clients or services. Moreover, users with large numbers of contacts may find that it takes inordinate or unacceptable amounts of time to synchronize contacts using a synchronization tool.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for retrieving contacts or contact data from multiple sources. In the disclosed examples, a user searching for information related to a contact has a search query sent to one or more services. For example, a user typing a recipient's name into an email client may have the recipient's name or a portion of the recipient's name automatically sent as a search query to one or more services. Each of the services provides a list of contacts that match the search query. The matching list of contacts is aggregated, deduplicated, and returned to the user. As a result, a user can avoid synchronizing contact information between services.

Figure 1:
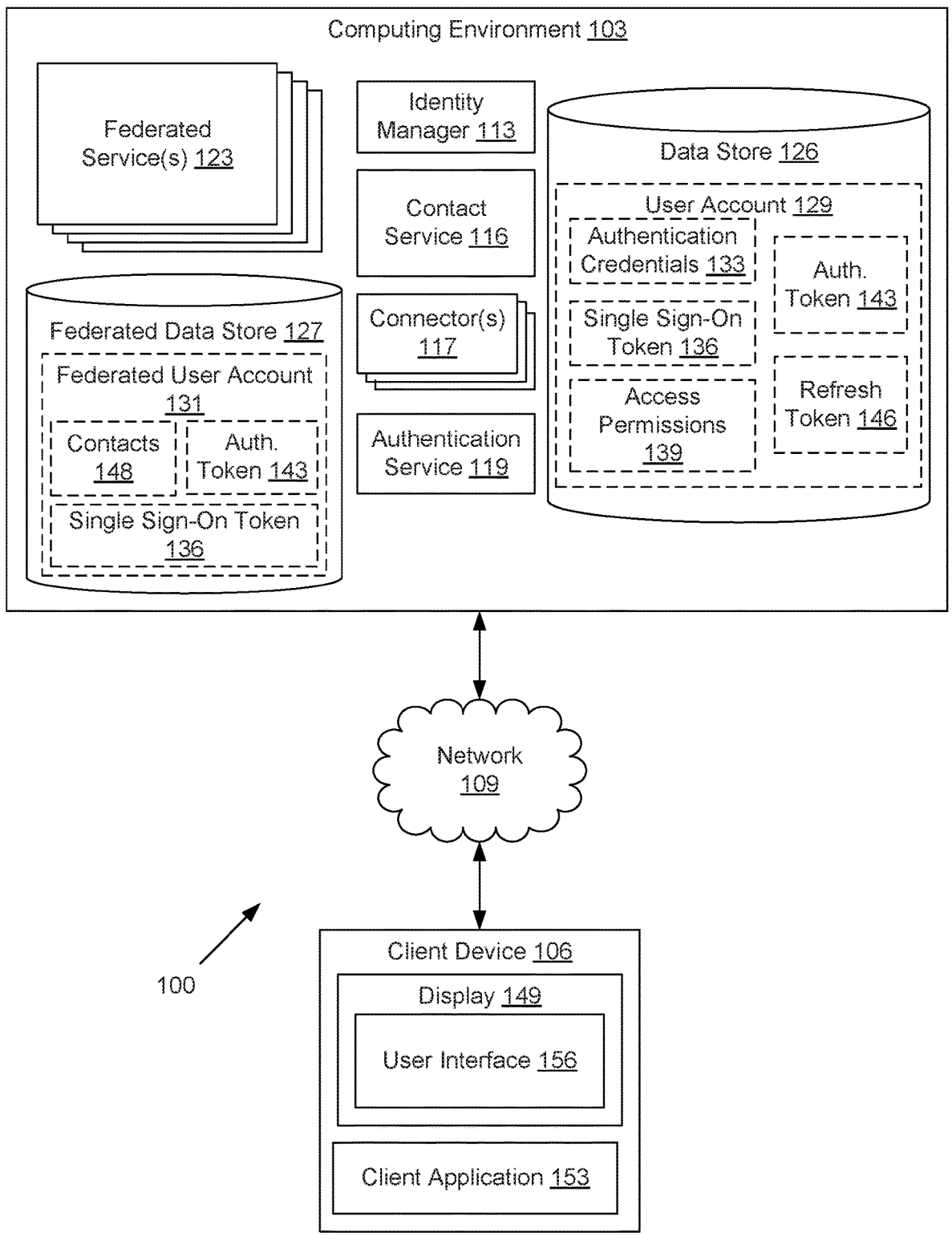
FIG. 1 is a schematic block diagram depicting an example of a network environment

Beginning with FIG. 1, shown is an example of a networked environment 100. The networked environment 100 includes a computing environment 103 and a client device 106, which are in data communication with each other across a network 109. The network 109 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various examples. The components executed in the computing environment 103, for example, can include an identity manager 113, a contact service 116, one or more connectors 117, and an authentication service 119. One or more federated services 123 can also be executed in the computing environment 103. In some embodiments, however, one or more of the federated services 123 can be executed in a separate computing environment that is in data communication with the computing environment 103 across the network 109.

Also, various data is stored in a data store 126 or a federated data store 127 that is accessible to the computing environment 103. The data store 126 or the federated data store 127 can be representative of a plurality of data stores, which can include relational databases, object-oriented databases, hierarchical databases, hash tables or similar key-value data stores, as well as other data storage applications or data structures. The data stored in the data store 126 is associated with the operation of the identity manager 113, the contact service 116, the connectors 117, the authentication service 119, and one or more of the federated services 123, as well as potentially other applications or functional entities described later. This data can include one or more user accounts 129 and potentially other data. The data stored in the federated data store 127 is associated with the operation of the federated services 123. This data can include one or more federated user accounts 131 and potentially other data. The federated data store 127 may be physically or logically separated from the data store 126 to reflect or ensure that access to the federated data store 127 is limited to one or more federated services 123. However, in some embodiments, the data store 126 and one or more of the federated data stores 127 may be implemented as a single data store 126.

The identity manager 113 can authenticate users and manage user authorizations or permissions to access applications, data, or other computing resources. For example, the identity manager 113 could correspond to a single sign-on portal that verifies a user's authentication credentials 133, issues a single sign-on token 136 that identifies the user, and verifies whether the user has the appropriate access permissions 139 to access one or more federated services 123. Examples of identity managers 113 include AMAZON's AWS Identity and Access Management (IAM) service, VMWARE's Identity Manager, or MICROSOFT's Active Directory Federation Services.

The authentication service 119 can retrieve and cache authentication data, such as authentication tokens 143 and refresh tokens 146, provided by various federated services 123. The cached authentication data can be used by the contact service 116 to query the federated services 123 for information.

The contact service 116 can be executed to search one or more federated services 123 for contacts 148 stored in association with a federated user account 131 in response to a query. As a result, the contact service 116 can allow for a user to search for contacts 148 stored across multiple databases or federated services 123 without having to synchronize those contacts 148 between each database or federated service 123.

A connector 117 can provide a standardized mechanism for the contact service 116 to communicate with a federated service 123. Each federated service 123 may provide an application programming interface (API) for communicating, querying, otherwise interacting with the federated service 123, which can include different methods or functions with different parameters compared to other federated services 123. This can allow for the contact service 116 to send a single, uniformly formatted query to one or more connectors 117. Each connector 117 is then responsible for using the information provided in the query from the contact service 116 to invoke the appropriate functions provided by the API of the federated service 123. To add support for a new federated service 123, a new connector 117 can be created without needing to modify the contact service 116 itself. Likewise, if a change is made to the API of the federated service 123, the connector 117 between the contact service 116 and the federated service can be updated without having to modify the contact service 116 itself.

A federated service 123 can be web application, web service, or other network facing application that can be accessed using a shared identity manager 113. One or more federated services 123 can be provided by the same provider or by different providers.

The user account 129 represents information associated with a user. The information can include one or more authentication credentials 133, one or more single sign-on tokens 136, and/or one or more access permissions 139 applied to the user account, as well as cached authentication tokens 143 and refresh tokens 146. Other information about the user can also be stored as part of the user account 129, such as the user's name or contact information.

The authentication credentials 133 represent the credentials that a user can present to the identity manager 113 to authenticate the user's identity. Authentication credentials 133 can include a combination of a username and password, a cryptographic certificate, a one-time password, or a combination of several of authentication credentials 133 as part of a multi-factor authentication schema. Examples of one-time passwords can include a one-time password generated using a version of the time-based one-time password algorithm (TOTP) or a one-time password generated using the HMAC-based one-time password (HOTP) algorithm.

The single sign-on (SSO) token 136 is a software token generated by the identity manager 113 in response to a successful authentication of the user with the identity manager 113 using the authentication credentials 133. The SSO token 136 can be used to provide the client device 106 access to various federated services 123 on behalf of the authenticated user. In some instances, such as those implementing a version of the KERBEROS protocol, a separate SSO token 136 can be generated for each federated service 123 that the client device 106 attempts to access on behalf of the user. In other instances, the single SSO token 136 can be generated and used to provide the client device 106 with access to several of the federated services 123. Although each of the federated services 123 can have a different set of authentication credentials 133 linked to the user account 129, such as a different user name and password combination, the SSO token 136 allows the user to authenticate once with the identity manager 113 in order to use each of the federated services 123 instead of having to authenticate with each of the federated services 123 separately.

The access permissions 139 represent computing resources that the user account is authorized to access. For example, the access permissions 139 can indicate that a user account is permitted to access some federated services 123 but is prohibited from accessing other federated services 123. As another example, the access permissions 139 can indicate that the user account 129 is allowed to access certain features of a federated service 123, but prohibited from accessing other features. For example, if one of the federated services 123 that a user was permitted to access was a customer relationship management (CRM) service, the user might have permission to access his or her own contacts but be prohibited from accessing the sales contacts of other users.

The authentication token 143 is a token provided by one of the federated services 123 in response to a successful authentication with the federated service 123. The authentication token 143 represents that a user account 129 is currently authenticated by the federated service 123 and authorized to access or otherwise interact with the federated service 123 in some capacity. For security purposes, the authentication token 143 often has a time-limit associated with it, such as 1 hour, 3 hours, 6 hours, 8 hours, or some other period of time). Once the time-limit has expired, the authentication token 143 can no longer be used to prove current authentication status of the user account 129 with the federated service 123. The authentication token 143 can be provided, for example, as part of an authentication exchange using a version of the OAUTH protocol.

The refresh token 146 is a token provided by one of the federate services 123 in response to a successful authentication with the federated service 123. The refresh token 146 can be used to acquire a new authentication token 143 once a current or previous authentication token 143 expires. The refresh token 146 often has a much longer time-limit associated with it, such as 1 day, 1 week, 30 days, 3 months, or 1 year, which allows for the refresh token 146 to be used to acquire a series of authentication tokens 143 after an initial successful authentication. In the event that a user's access is revoked, the refresh token 146 can be marked invalid, preventing the refresh token 146 from being used to acquire new authentication tokens 143. The refresh token 146 can be provided, for example, as part of an authentication exchange using a version of the OAUTH protocol.

The federated user account 131 represents a user of a respective or corresponding federated service 123. A user with a user account 129 may also have multiple federated user accounts 131. For example, a user may have one federated user account 131 for each federated service 123 that the user is registered or enrolled with. As another example, the user may have multiple federated user accounts 131 for a federated service 123 (e.g., a personal federated user account 131 and a separate federated user account 131 for business or professional purposes).

The federated user account 131 can include an SSO token 136, an authentication token 143, and one or more contacts 148. A contact 148 can represent contact data for an individual. The contact data can include a first, last, or middle name of the individual. The contact data can also include one or more titles of the individual. The contact data can include one or more telephone numbers at which the individual can be reached. Likewise, the contact data can include one or more email addresses at which the individual can be reached. In some instances, the contact data can include one or more street or mailing addresses at which the individual can be reached. In some implementations, miscellaneous notes about the individual can also be stored in the contact data for the individual. A contact 148 can be stored in various formats, such as a virtual contact file (VCF), extensible markup language (XML), or other representation.

The client device 106 is representative of a plurality of client devices 106 that can be coupled to the network 109. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 149, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as one or more client applications 153. The client application 153 can cause a user interface 156 to be rendered on the display 149. The client application 153 can represent various types of applications executable by the client device 106. For example, the client application 153 could be a web browser and the user interface 156 could include a web page rendered within a browser window. As another example, the client application 153 could be an email application and the user interface 156 could represent a graphical user interface for viewing, editing, and composing emails. Likewise, the client application 153 could be a chat or messaging application and the user interview 156 could represent a graphical user interface for sending and receiving messages with another user.

Next, a general description of the operation of the various components of the networked environment 100 is provided. A more detailed description of the implementations of various examples of the present disclosure is provided later in the discussion of the subsequent figures.

To begin, a user of the client device 106 authenticates with the identity manager 113. For example, the identity manager 113 can generate and send a web page to a browser executing on the client device 106. The user can use the web page to submit his or her authentication credentials 133 to the identity manager 113. The identity manager 113 can then determine whether the submitted authentication credentials 133 match the authentication credentials 133 stored for the user account 129. If the authentication credentials 133 match, the identity manager 113 determines that the user is authenticated. In response, the identity manager 113 can generate an SSO token 136 to represent the authenticated user. In some embodiments, the identity manager 113 can also notify the authentication service 119 of the authentication event. In these embodiments, the notification can include a user identifier and the SSO token 136. In other embodiments, the identity manager 113 can instead provide the SSO token 136 to the client application 153 executing on the client device 106. In these embodiments, the client application then provides the SSO token 136 to the authentication service 119.

The authentication service 119 can then authenticate the user with one or more of the federated services 123 in the background. For example, the authentication service 119 can send the user's SSO token 136 to each federated service 123 that an access permission 139 indicates a user is authorized to access. In other instances, the authentication service 119 can send the user's SSO token 136 to every federated service 123 that is registered with the identity manager 113. In some embodiments, the SSO token 136 can be included in an authentication request that complies with a version of the OAUTH protocol.

In response to an authentication request from the authentication service 119, the federated service verifies that the user account 129 associated with the SSO token 136 is allowed to access the federated service 123. For example, the federated service 123 can query the data store 126 to retrieve a username or other user identifier for the user account 129 associated with the single sign-on token 136. The federated service 123 can then compare the retrieved username or other user identifier with its own list of registered or authorized users. If the retrieved username or other user identifier matches a username or user identifier stored in the list of registered or authorized users maintained by the federated service 123, then the federated service 123 can determine that the user account 129 linked to the SSO token 136 is authorized to access the federated service 123. Upon successful authorization, the federated service 123 can generate an authentication token 143 and a refresh token 146 and provide them to the authentication service 119. In some instances, the authentication token 143 and the refresh token 146 can be included in a response that complies with a version of the OAUTH protocol.

The authentication service 119 can then cache or otherwise store the authentication token 143 and the refresh token 146 for future use. The authentication service 119 can, for example, provide the authentication token 143 in response to requests from authorized applications. For example, the authentication service 119 can provide the authentication token 143 for the user in response to a request from the contact service 116.

In addition, the authentication service 119 can automatically obtain a new authentication token 143 for the user when the current authentication token 143 expires or is about to expire. For example, the authentication service 119 can determine that the authentication token 143 was obtained 59 minutes ago, but is only valid for one hour. As another example, the authentication service 119 can determine that the authentication token 143 was obtained 61 minutes ago, but the authentication token 143 was only valid for one hour. In response to either example, the authentication service 119 can submit a second authentication request to the federated service 123. The second authentication request can include the refresh token 146.

In response, the federated service 123 can evaluate the refresh token 146 to determine whether the refresh token 146 is still valid. For example, the federated service 123 could evaluate the refresh token 146 to determine whether it has expired. As another example, the federated service 123 could evaluate the refresh token 146 to determine whether it has been revoked. If the refresh token 146 remains valid, the federated service 123 can then provide the authentication service 119 with a new authentication token 143.

Meanwhile, after the user has authenticated with the identity manager 113, the user may begin using a client application 153 executing on the client device 106. For example, the user may open an email application to compose an email. While using the client application 153, the user may attempt to search for one or more contacts 148.

The client application 153 can then send a search query to the contact service 116. The search query can contain various parameters, such as part of the name, email address, street address, mailing address, or phone number of a contact 148. For example, the client application 153 may allow the user to submit a query in a search field of the user interface 156. As another example, the client application 153 may begin to speculatively or predictively search for a contact 148 based on a user's interactions with the client application 153. For example, after a user has typed a few characters of an email address in the address field of an email, the client application 153 may submit a search query to the contact service 116 and present the results to the user. As the user enters additional characters of the email address in the address field of the email, the client application 153 may submit subsequent search queries to the contact service 116 containing the longer character string and present the results to the user.

In response to receiving a query form the client application 153, the contact service 116 identifies the user account 129 of the user. The contact service 116 then checks the access permissions 139 of the user account to determine which of the federated services 123 the user is allowed to search. The contact service 116 then provides the SSO token 136 and the query to each connector 117 for a respective federated service 123 that the user is permitted to search.

Each connector 117 then invokes the API of the respective federated service 123 to retrieve the contacts 148 that match the query. The federated service 123 searches the contacts 148 and provides the matching contacts to the connector 117 in response. Each connector 117 then provides the matching contacts 148 received from the federated service 123 to the contact service 116. The contact service 116 removes or consolidates duplicate contacts 148 and then provides the remaining matching contacts 148 to the client application 153. The client application 153 then displays one or more of the matching contacts 153 within the user interface 156.

Figure 2:
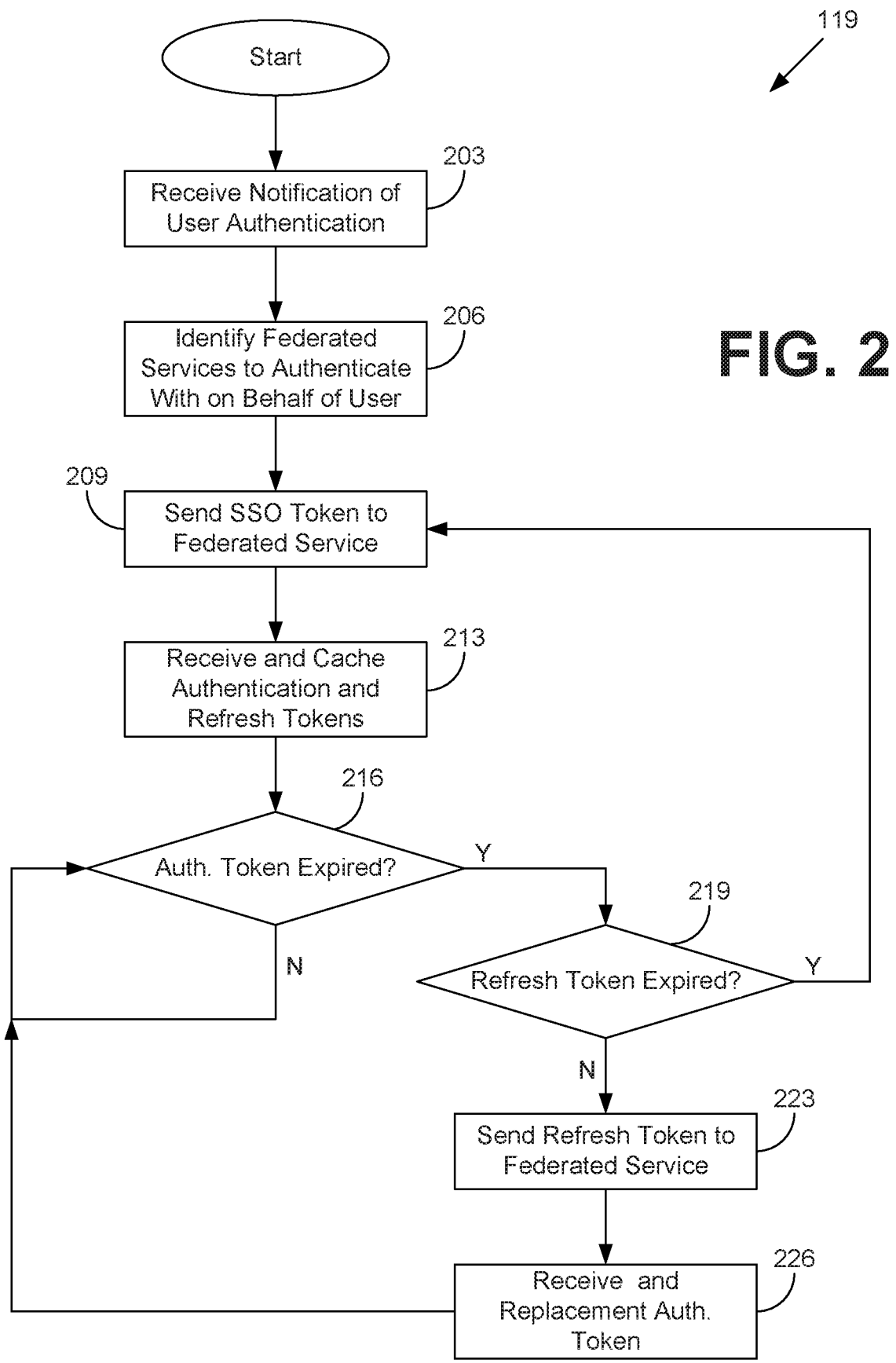
FIG. 2 is a flow chart depicting the operation of an example of a component of the client device of the network environment of FIG. 1.

FIG. 2 is a flowchart depicting an example of the operation of a portion of the authentication service 119. It is understood that the flowchart of FIG. 2 provides merely an example of the many different types of functional arrangements that can be employed to implement the portion of the authentication service 119 as described herein. As an alternative, the flowchart of FIG. 2 can be viewed as depicting an example of elements of a method implemented by the authentication service 119 in some implementations.

Beginning at step 203, the authentication service 119 can receive a notification that a user has successfully authenticated. The notification can include an identifier of the user account and an SSO token 136 for the user account. The SSO token 136 can be included, for example, in a JSON web token. In some instances, the notification can be received from the identity manager 113. In other instances, the notification can be received from the client application 153 executing on the client device 106.

Moving on to step 206, the authentication service 119 can identify which federated services 123 the authentication service 119 is to authenticate with on behalf of the user represented by the user account 129. For example, the authentication service 119 could check one or more access permissions 139 to evaluate which of the federated services 123 the user is authorized to access or the user is prohibited from accessing. In some instances, the authentication service 119 can skip or omit this step and instead attempt to authenticate on behalf of the user with all of the federated services 123. In these instances, the authentication service 119 instead relies on the individual federated services 123 to properly evaluate the user's authorization to access them.

Proceeding to step 209, the authentication service 119 can send the SSO token 136 to one or more federated services 123. Some of the federated services 123 can have custom or unique workflows for authenticating a user or obtaining a user's consent to allow third-party programs such as the authentication service 119 interact with the federated service 123. Accordingly, the authentication service 119 can rely on a custom module or plugin that allows the authentication service 119 to interact with the federated service 123. Such a custom module or plugin can use an HTML parser to identify components of an authentication or authorization web page for obtaining a user's consent to permit the authentication service 119 to access the federated service 123 and a customer hypertext transfer protocol (HTTP) request generator that can send customized HTTP requests to the federated service 123 to indicate a user's consent.

Referring next to step 213, the authentication service 119 can receive an authentication token 143 and a refresh token 146. The authentication token 143 and the refresh token 146 can be included in a response that complies with a version of the OAUTH protocol. Upon receipt of the authentication token 143 and the refresh token 146, the authentication service 119 caches both the authentication token 143 and the refresh token 146 in the data store 126 and links the authentication token 143 and the refresh token 146 with corresponding user account 129 linked to the SSO token 136.

Moving on to step 216, the authentication service 119 can determine or evaluate the authentication token 143 to determine if it has expired or is about to expire. For example, the authentication service 119 can determine that the authentication token 143 is valid for 60 minutes, but the authentication token 143 was received more than 60 minutes ago. In an alternative example, the authentication service 119 can determine that the authentication token 143 is valid for 60 minutes, but was received 59 minutes ago and is therefore about to expire. This step can be performed on a periodic basis to minimize any service interruptions to the user due to an expired authentication token 143.

Upon expiration or imminent expiration of the authentication token 143, the authentication service 119 can evaluate the refresh token 146 to determine if the refresh token 146 remains valid. For example, the authentication service 119 can evaluate the refresh token 146 to determine if it has expired. Often times, refresh tokens 146 are valid for longer periods of time than authentication tokens 143. This allows for the refresh token 146 to be used to acquire multiple subsequent authentication tokens 143. As another example, the authentication service 119 can evaluate the refresh token 146 to determine whether or not the refresh token 146 has been revoked. For example, if a user's access to a federated service 123 had been revoked, the refresh token's rights to acquired new authentication tokens 143 can be revoked in order to deny the user further access to the federated service 123.

If the refresh token 146 is determined to be invalid, the flow of execution of the authentication service 119 returns to step 209. For example, if the refresh token 146 has expired, the flow of execution can return to step 209 in order for the authentication service 119 to acquire a new refresh token 146 and a new authentication token 143.

However, if the refresh token 146 remains valid, the flow of execution of the authentication service instead proceeds to step 223. Here, the authentication service 119 can send the refresh token 146 to the federated service 123 as part of a request to obtain a new authentication token 143. The request can be formatted to comply with a version of the OAUTH protocol in some embodiments.

Moving on to step 226, the authentication service 119 can receive the replacement authentication token 143 in response to the request sent at step 223. In some embodiments, the response containing the authentication token 143 can comply with a version of the OAUTH protocol. Upon receipt of the replacement authentication token 143, the authentication service 119 can replace the previous authentication token 143 cached in the data store 126 with the replacement authentication token 143. After receiving and caching the replacement authentication token 143, the flow of execution of the authentication service returns to step 216 in order to monitor the status of the replacement authentication token 143.

Figure 3:
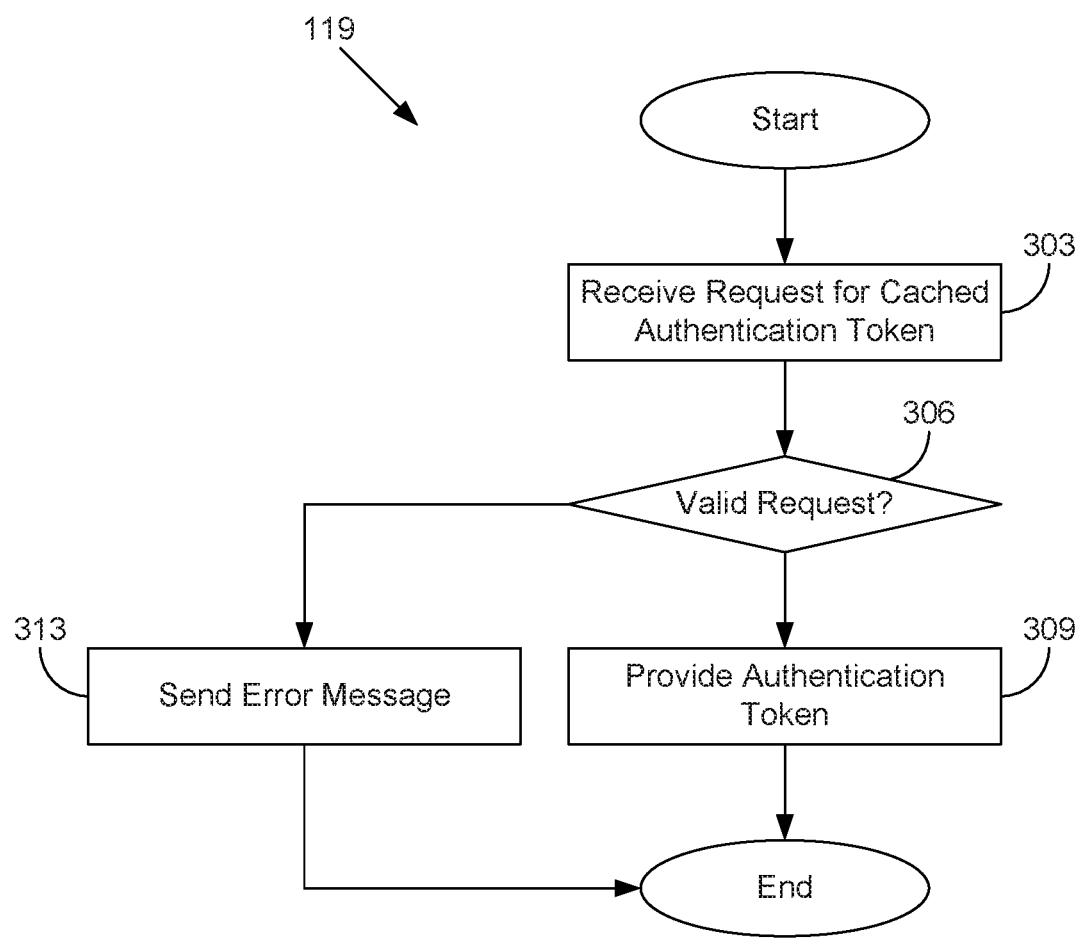
FIG. 3 is a flow chart depicting the operation of an example of a component of the client device of the network environment of FIG. 1.

FIG. 3 is another flowchart depicting an example of the operation of a portion of the authentication service 119. It is understood that the flowchart of FIG. 3 provides merely an example of the many different types of functional arrangements that can be employed to implement the portion of the authentication service 119 as described herein. As an alternative, the flowchart of FIG. 3 can be viewed as depicting an example of elements of a method implemented by the authentication service 119 in some implementations.

Beginning with step 303, the authentication service 119 can receive a request for a cached authentication token 143 linked with a user account 129, such as the authentication token 143 stored in the data store 126. The request can be received from a variety of sources. For example, the contact service 116 can send the request for the authentication token 143 to the authentication service 119 in some embodiments.

Moving on to step 306, the authentication service 119 can evaluate the request to determine if it is valid. For example, the authentication service 119 could determine whether the requesting application is authorized to use the authentication service 119. As another example, the authentication service 119 could determine whether the requesting application is authorized to access the user's authentication token 143.

Proceeding to step 309, the authentication service 119 can provide the authentication token 143 to the requesting process in a response. However, if the flow of execution instead proceeds from step 306 to step 313, the authentication service 119 can instead provide an error message to the requesting process indicating that access to the authentication token 143 was denied or that some other error occurred.

Figure 4:
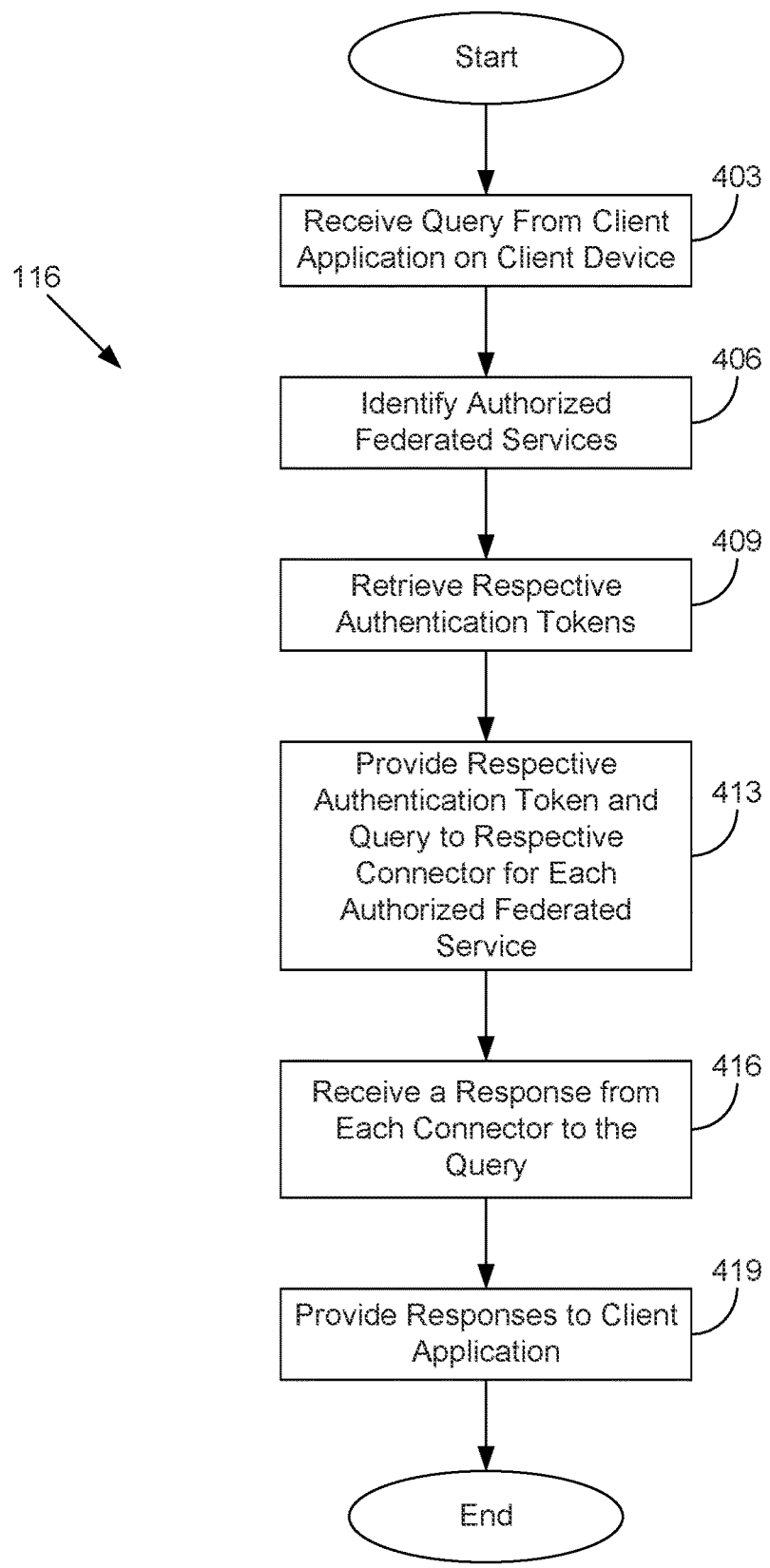
FIG. 4 is a flow chart depicting the operation of an example of a component of the client device of the network environment of FIG. 1.

FIG. 4 is a flowchart depicting an example of the operation of a portion of the contact service 116. It is understood that the flowchart of FIG. 4 provides merely an example of the many different types of functional arrangements that can be employed to implement the portion of the contact service 116 as described herein. As an alternative, the flowchart of FIG. 4 can be viewed as depicting an example of elements of a method implemented by the contact service 116 in some implementations.

Beginning at step 403, the contact service 116 can receive a query from a client application 153 for one or more contacts 148. The query from the client application 153 can include a character string to be used to identify contacts 148, a user identifier such as a username or an SSO token 136, and potentially other data.

Proceeding to step 406, the contact service 116 can identify or otherwise determine which of the federated services 123 the user is allowed to access when searching for contacts 148. For example, the contact service 116 may check the access permissions 139 stored in association with a user account 129 to see which federated services 123 a user is allowed to access. For example, the access permissions 139 may act as a whitelist, in which case any federated service 123 listed in the access permissions 139 may be identified by the contact service 116 as a federated service 123 that the user is permitted to access.

In some instances, the access permissions 139 may be more fine-grained. For example, the access permissions 139 may specify that a user is permitted to access a particular federated service 123 to search for contacts 148 when using an email client configured to check a corporate email account, but is not permitted to access the particular federated service when searching for contacts from another application using a personal account. For instance, an enterprise may use this functionality to limit a user's ability to access a customer relationship management (CRM) federated service 123 (e.g., SALESFORCE) or the enterprises's directory service (e.g., ACTIVE DIRECTORY global address list) to an email client configured to use a corporate email account. This would prevent users from accessing corporate or business contacts from a personal context.

Subsequently at step 409, the contact service 116 can send a request to the authentication service 119 for an authentication token 143 for each federated service that the user is authorized to access. The contact service 116 can include an identifier for the user account 129 (e.g., a username registered with the federated service 123 or the SSO token 136) as well as an identifier for each federated service 123 the user is authorized to access. In response to the request, the contact service 116 receives the requested authentication token 143 in response.

Proceeding to step 413, the contact service 116 provides the respective authentication token 143 for the federated service 123 and the query received from the client application 153 to a connector 117 for the respective federated service 123. When multiple federated services 123 are to be queried (e.g., when a user is authorized to access multiple federated services 123), then the query may be simultaneously or nearly simultaneously provided to each connector 117 for a federated service 123 along with an appropriate authentication token 143 for each federated service 123.

Referring next to step 416, the contact service 116 receives a response from each connector 117. The response can include a list of contacts 148 stored by the federated service 123 that match the character string included in the query.

Moving next to step 419, the contact service 116 provides the contacts 148 received from each of the federated services 123 to the client application 153. In some instances, the contact service 116 may consolidate or remove duplicate contacts 148. The contact service 116 could then send the remaining contacts 116 to the client application 153.

Duplicate contacts 148 can be identified in a number of ways. For example, two contacts 148 could be identified as duplicates if each of the contacts 148 had the same value for a uniquely identifying piece of information. For instance, if two contacts 148 had the same email address, they could be considered to be duplicate contacts 148 for the same person or entity. Similarly, two or more pieces of information that, individually, were not uniquely identifying could be used in combination to uniquely identify an individual. For example, while multiple people may share a telephone number, it is unlikely that two individuals with the same first and last name would share the same telephone number. Therefore, if two contacts 148 had the same values for the same set of information (e.g., the same first name, last name, and cellphone number), then the contact service 116 could determine that the two contacts 148 were for the same individual. Other approaches may also be used, as appropriate.

When duplicate contacts 148 are identified, the contact service 116 can merge or consolidate the duplicate contacts 148 into a single contact 148 in the search results or delete one of the two duplicate contacts 148 from the search results. For example, the contact service 116 may create and add a new contact 148 to the search results and populate the new contact 148 with the information from the two duplicate contacts 148. As another example, the contact service 116 may fill in the data missing from one contact 148 in the search results with data present in the duplicate contact 148. For example, the contact service 116 may add personal email addresses and telephone numbers from a first contact 148 in the search results for an individual to a second contact 148 in the search results for the individual that lacks the personal email addresses and telephone numbers. The contact service 116 might then remove the first contact 148 for the individual from the resulting contacts 148 to be provided to the client application 153.

Figure 5:
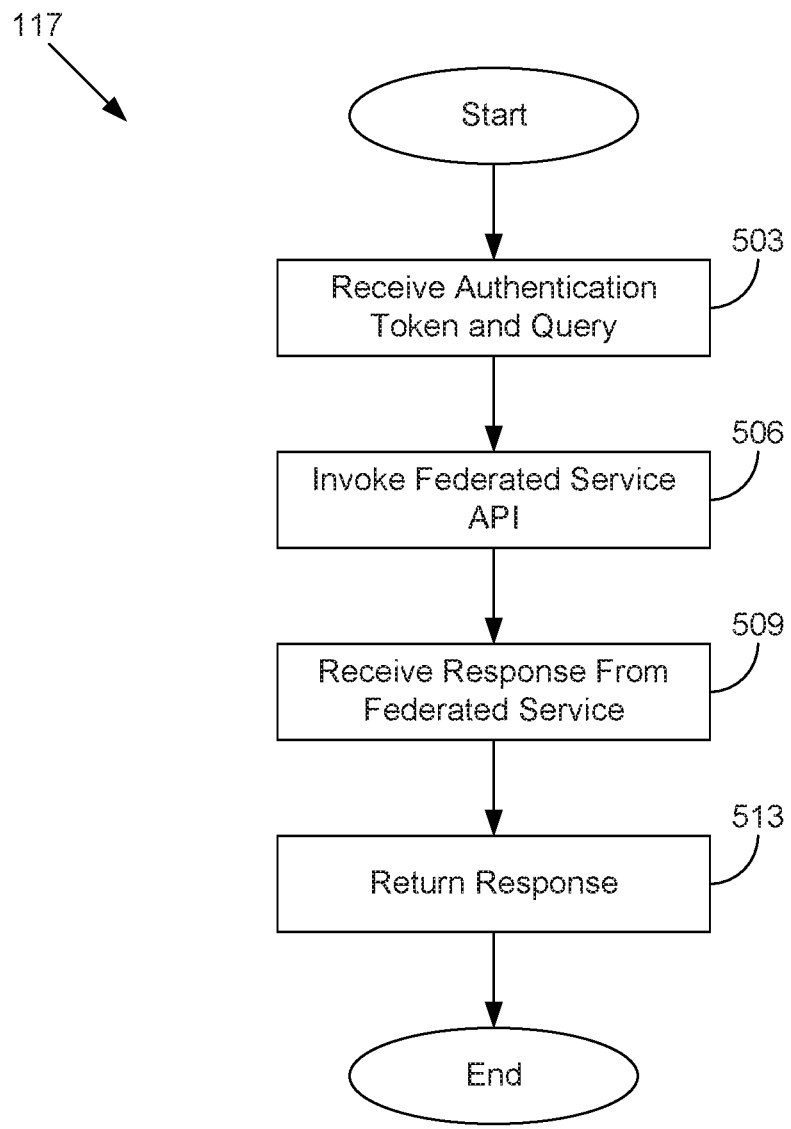
FIG. 5 is a flow chart depicting the operation of an example of a component of the client device of the network environment of FIG. 1.

FIG. 5 is a flowchart depicting an example of the operation of a portion of a connector 117. It is understood that the flowchart of FIG. 5 provides merely an example of the many different types of functional arrangements that can be employed to implement the portion of a connector 117 as described herein. As an alternative, the flowchart of FIG. 5 can be viewed as depicting an example of elements of a method implemented by a connector 117 in some implementations.

Beginning with step 503, the connector 117 receives from the contact service 116 at least an authentication token 143 for a federated service 123 and a query containing a character string. In some implementations, the connector 117 may also receive a user identifier, such as the SSO token 136 representing the user. In some instances, the connector 117 may receive additional information from the contact service 116 for the respective federated service 123 that the connector 117 is configured to interact with on behalf of the contact service 116.

Moving on to step 506, the connector 117 invokes one or more function calls of an application programming interface (API) provided by the federated service 123. The connector 117 may supply the user identifier, the query or character string within the query, and/or the authentication token 143 as values for respective arguments of one or more of the function calls.

Proceeding to step 509, the connector 117 receives a response from the federated service 123. The response can include one or more contacts 148 that the federated service 123 has stored in association with a federated user account 131 representing the user.

Finally, at step 513, the connector 117 returns a response to the contact service 116. The response can include the contacts 148 that the federated service 123 returned as matching the query. In some instances, the connector 117 may reformat, translate, convert, or otherwise alter the contacts 143 provided by the federated service 123 into a format that can be used by the contact service 116.

Figure 6:
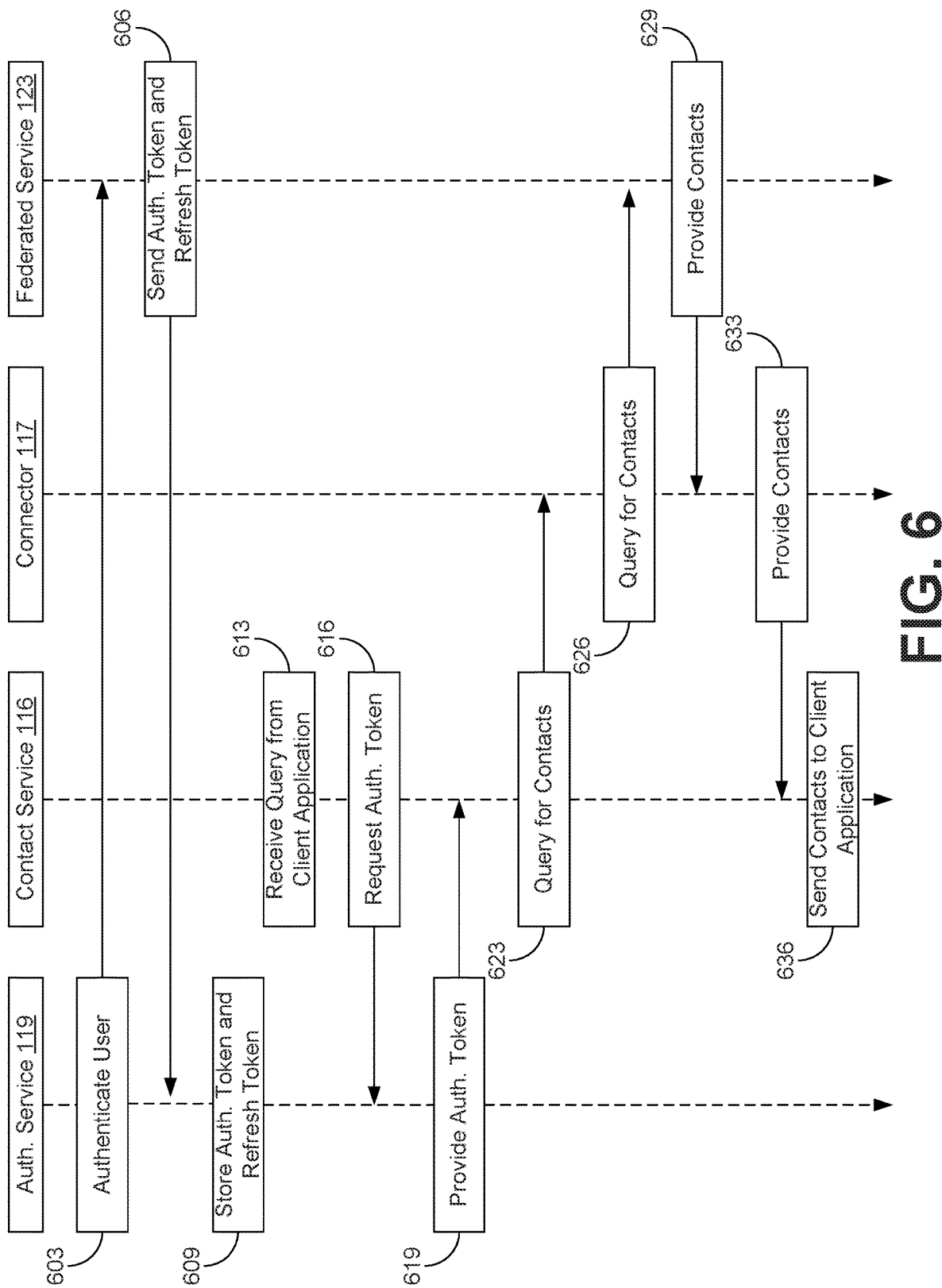
FIG. 6 is a sequence diagram depicting the operation of an example of a component of the client device of the network environment of FIG. 1.

FIG. 6 is a sequence diagram depicting an example of the interactions of various components of the network environment 100. It is understood that the sequence diagram of FIG. 6 provides merely an example of the many different types of functional arrangements that can be employed to implement the portions of the network environment 100 as described herein. As an alternative, the sequence diagram of FIG. 6 can be viewed as depicting an example of elements of a method implemented within the network environment 100 in some implementations.

Beginning with step 603, the authentication service 119 can authenticate the user with a federated service 123. This may occur in response to receipt of an SSO token 136 from the identity manager 113. For example, the SSO token 136 may be provided by the identity manager 113 in response to a successful authentication by a user with the identity manager 113.

To authenticate the user with the federated service 123, the authentication service 119 can provide the SSO token 136 to the federated service 123, indicating that the user has already authenticated himself or herself with the identity manager 113 and should be granted access to the federated service 123. In response, the federated service 123 can determine that the user account 129 represented by the SSO token 136 is authorized to access or interact with the federated service 123.

In response, at step 606, the federated service 123 can provide an authentication token 143 and a refresh token 146 to the authentication service 119. The authentication token 143 or refresh token 146 can be generated in response to authentication of the user with the federated service 123 by the authentication service 119. A predefined period of time for which the authentication token 143 and the refresh token 146 are valid can also be generated, assigned, or otherwise determined at this point.

Proceeding to step 609, the authentication service 119 can store the authentication token 143 and the refresh token 146 that are provided by the federated service 123. Storing the authentication token 143 allows the authentication service 119 to provide the authentication token 143 to authorized applications. Likewise, storing the refresh token 146 allows the authentication service 119 to acquire new authentication tokens 143 as they expire.

Next, at step 613, the contact service 116 can receive a query or similar request from a client application 153 for one or more contacts 138 that match a character string included in the query. The query can also include a user identifier, such as the SSO token 136.

Moving on to step 616, the contact service 116 can request an authentication token 143 from the authentication service 119 for each federated service 123 that the user is authorized to access. Using the authentication tokens 143 provided by the authentication service 119 allows the contact service 116 to use the previously acquired authentication token 143 instead of performing its own authentication with the federated service 123 on behalf of the user. The request can include a user identifier and an identifier of the federated service 123 in order for the authentication service 119 to identify and return the correct authentication token 143.

In response, at step 619, the authentication service 119 can provide the requested authentication token 143 to the contact service 116.

At step 623, the contact service 116 can then send a request for contacts 148 to the connector 117 for each federated service 123 that the user is authorized to access in order to query the federated service 123 for any contacts 148 matching the character string in the query received from the client application 153. The query provided to the connector 117 can include a respective authentication token 143 for the federated service 123, the character string included in the query previously received at step 613, and potentially other relevant information.

Next, at step 626, the connector 117 uses the provided authentication token 143 and query string to invoke one or more function calls exposed by the API of the federated service 123.

Proceeding to step 629, the federated service 123 provides one or more contacts 148 that match the character string included in the query to the connector 117.

At step 633, the connector 117 then forwards the received contacts 148 to the contact service 116. Because each federated service 123 may return contacts 148 in a different format, the connector 117 may convert, translate, or otherwise reformat the resulting contacts 148 received from the federated service 123 into a format that is compatible with the contact service 116 prior to returning the contacts 148 to the contact service 116.

Finally, at step 636, the contact service 116 returns the contacts 148 received from the federated services 123 through the connectors 117 to the client application 153. In some implementations, the contact service 116 may combine, remove, or reconcile duplicate contacts 148 returned from different federated services 123.

The flowcharts of FIGS. 2-5 and the sequence diagram of FIG. 6 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 2-5 and the sequence diagram of FIG. 6 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

Therefore, the following is claimed:

1. A system for retrieving contacts from a plurality of federated services, comprising:
   a computing device comprising a processor and a memory;
   machine readable instructions stored in the memory that, when executed by the processor, cause the computing device to at least:
      receive a query from a client application executing on a client device, the query comprising:
         a single sign-on token that identifies a user account of a user, wherein the single sign-on token is a token generated by an identity manager in an instance in which a successful authentication has been achieved, the single sign-on token being provided to the client device for access to the plurality of federated services, and
         a character string;
      determine which ones of the plurality of federated services are to be authenticated using the client application based on an access permission for the client application, the access permission specifying that the user account is permitted to authenticate the ones of the plurality of federated services in an instance of using the client application;
      send the single sign-on token to an authentication service of the ones of the plurality of federated services that the user has permission to authenticate;
      receive a plurality of authentication tokens from the authentication service in response to sending the single sign-on token to the authentication service, each of the plurality of authentication tokens identifying the user to a respective one of the plurality of federated services, each of the plurality of authentication tokens having a predefined period of validity for authenticating the user;
      provide a respective authentication token and the character string to a respective connector for each of the plurality of federated services that the user has permission to access;
      receive a plurality of responses, each of the plurality of responses being received from the respective connector corresponding to each of the plurality of federated services that the user has permission to access; and
      provide the plurality of responses to the client application executing on the client device.

2. The system for retrieving contacts from a plurality of federated services of claim 1, wherein the machine readable instructions that cause the computing device to at least determine which ones of the plurality of federated services that the user has permission to access further causes the computing device to at least determine that the user is included in a respective list of authorized users for each one of the plurality of federated services.

3. The system for retrieving contacts from a plurality of federated services of claim 1, wherein:

each of the plurality of responses comprises at least one contact stored by the federated service that matches the query; and
the machine readable instructions that cause the computing device to at least provide the plurality of responses to the client application executing on the client device further cause the computing device to at least:
   identify a plurality of contacts within the plurality of responses that identify the same person;
   merge the plurality of contacts that identify the same person into a single contact that identifies the same person; and
   replace the plurality of contacts within the plurality of responses that identify the same person with the single contact that identifies the same person.

4. The system for retrieving contacts from a plurality of federated services of claim 3, wherein the machine readable instructions that cause the computing device to identify the plurality of contacts within the plurality of responses that identify the same person comprises determining that each of the plurality of contacts that identify the same person comprise a shared email address.

5. The system for retrieving contacts from a plurality of federated services of claim 1, wherein the machine readable instructions that cause the computing device to at least provide the single sign-on token and the character string to the respective connector for each of the plurality of federated services that the user has permission to access further cause the computing device to simultaneously provide the single sign-on token and the character string to the respective connector for each of the plurality of federated services that the user has permission to access.

6. The system for retrieving contacts from a plurality of federated services of claim 1, wherein the character string comprises at least a portion of a name of a contact.

7. The system for retrieving contacts from a plurality of federated services of claim 1, wherein the character string comprises at least a portion of an email address.

8. A method for retrieving contacts from a plurality of federated services, comprising:
   receiving a query from a client application executing on a client device, the query comprising:
      a single sign-on token that identifies a user account of a user, wherein the single sign-on token is a token generated by an identity manager in an instance in which a successful authentication has been achieved, the single sign-on token being provided to the client device for access to the plurality of federated services, and
      a character string;
   determining which ones of the plurality of federated services are to be authenticated using the client application based on an access permission for the client application, the access permission specifying that the user account is permitted to authenticate the ones of the plurality of federated services in an instance of using the client application;
   sending the single sign-on token to an authentication service of the ones of the plurality of federated services that the user has permission to authenticate;
   receiving a plurality of authentication tokens from the authentication service in response to sending the single sign-on token to the authentication service, each of the plurality of authentication tokens identifying the user to a respective one of the plurality of federated services, each of the plurality of authentication tokens having a predefined period of validity for authenticating the user;

providing a respective authentication token and the character string to a respective connector for each of the plurality of federated services that the user has permission to access;

receiving a plurality of responses, each of the plurality of responses being received from the respective connector corresponding to each of the plurality of federated services that the user has permission to access; and providing the plurality of responses to the client application executing on the client device.

9. The method for retrieving contacts from the plurality of federated services of claim 8, wherein determining which ones of the plurality of federated services that the user has permission to access further comprises determining that the user is included in a respective list of authorized users for each one of the plurality of federated services.

10. The method for retrieving contacts from the plurality of federated services of claim 8, wherein each of the plurality of responses comprises at least one contact stored by a federated service that matches the query, and providing the plurality of responses to the client application executing on the client device further comprises:

identifying a plurality of contacts within the plurality of responses that identify the same person;

merging the plurality of contacts that identify the same person into a single contact that identifies the same person; and replacing the plurality of contacts within the plurality of responses that identify the same person with the single contact that identifies the same person.

11. The method for retrieving contacts from the plurality of federated services of claim 10, wherein identifying the plurality of contacts within the plurality of responses that identify the same person comprises determining that each of the plurality of contacts that identify the same person comprise a shared email address.

12. The method for retrieving contacts from the plurality of federated services of claim 8, wherein providing the single sign-on token and the character string to a respective connector for each of the plurality of federated services that the user has permission to access further comprises simultaneously providing the single sign-on token and the character string to a respective connector for each of the plurality of federated services that the user has permission to access.

13. The method for retrieving contacts from the plurality of federated services of claim 8, wherein the character string comprises at least a portion of a name of a contact.

14. The method for retrieving contacts from the plurality of federated services of claim 8, wherein the character string comprises at least a portion of an email address.

15. A non-transitory, computer readable medium for retrieving contacts from a plurality of federated services, the non-transitory, computer readable medium comprising machine-readable instructions that, when executed by a processor of a computing device, cause the computing device to at least:

receive a query from a client application executing on a client device, the query comprising:

a single sign-on token that identifies a user account of a user, wherein the single sign-on token is a token generated by an identity manager in an instance in which a successful authentication has been achieved, the single sign-on token being provided to the client device for access to the plurality of federated services, and a character string;

determine which ones of the plurality of federated services are to be authenticated-using the client application based on an access permission for the client application, the access permission specifying that the user account is permitted to authenticate the ones of the plurality of federated services in an instance of using the client application;

send the single sign-on token to an authentication service of the ones of the plurality of federated services that the user has permission to authenticate;

receive a plurality of authentication tokens from the authentication service in response to sending the single sign-on token to the authentication service, each of the plurality of authentication tokens identifying the user to a respective one of the plurality of federated services, each of the plurality of authentication tokens having a predefined period of validity for authenticating the user;

provide a respective authentication token and the character string to a respective connector for each of the plurality of federated services that the user has permission to access;

receive a plurality of responses, each of the plurality of responses being received from the respective connector corresponding to each of the plurality of federated services that the user has permission to access; and provide the plurality of responses to the client application executing on the client device.

16. The non-transitory, computer readable medium for retrieving contacts from a plurality of federated services of claim 15, wherein the machine readable instructions that cause the computing device to at least determine which ones of the plurality of federated services that the user has permission to access further causes the computing device to at least determine that the user is included in a respective list of authorized users for each one of the plurality of federated services.

17. The non-transitory, computer readable medium for retrieving contacts from a plurality of federated services of claim 15, wherein:

each of the plurality of responses comprises at least one contact stored by the federated service that matches the query; and the machine readable instructions that cause the computing device to at least provide the plurality of responses to the client application executing on the client device further cause the computing device to at least:

identify a plurality of contacts within the plurality of responses that identify the same person;

merge the plurality of contacts that identify the same person into a single contact that identifies the same person; and replace the plurality of contacts within the plurality of responses that identify the same person with the single contact that identifies the same person.

18. The non-transitory, computer readable medium for retrieving contacts from a plurality of federated services of claim 15, wherein the machine readable instructions that cause the computing device to at least provide the single sign-on token and the character string to the respective connector for each of the plurality of federated services that the user has permission to access further cause the computing device to simultaneously provide the single sign-on token and the character string to the respective connector for each of the plurality of federated services that the user has permission to access.

19. The non-transitory, computer readable medium for retrieving contacts from a plurality of federated services of claim 15, wherein the character string comprises at least a portion of a name of a contact.

20. The non-transitory, computer readable medium for retrieving contacts from a plurality of federated services of claim 15, wherein the machine readable instructions that cause the computing device to at least:
- receive a refresh token from the ones of the plurality of federated services;
- determine that the refresh token has not expired in an instance in which the one of the plurality of authentication tokens has expired;
- send the refresh token to a respective one of the plurality of federated services to obtain a replacement authentication token; and
- receive the replacement authentication token from the respective one of the plurality of federated services an instance in which the refresh token has been transmitted.

* * * * *